United States Patent
Hara et al.

(10) Patent No.: US 9,127,966 B2
(45) Date of Patent: Sep. 8, 2015

(54) PHYSICAL QUANTITY DETECTION APPARATUS AND INSPECTION METHOD OF PHYSICAL QUANTITY DETECTION APPARATUS

(75) Inventors: Tetsuya Hara, Kariya (JP); Takamitsu Kubota, Chiryu (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 13/546,068

(22) Filed: Jul. 11, 2012

(65) Prior Publication Data
US 2013/0018619 A1  Jan. 17, 2013

(30) Foreign Application Priority Data
Jul. 13, 2011  (JP) .................................. 2011-154657

(51) Int. Cl.
*G01D 18/00* (2006.01)
*G01D 5/14* (2006.01)
(Continued)

(52) U.S. Cl.
CPC ................ *G01D 5/145* (2013.01); *G01B 21/00* (2013.01); *G01B 21/22* (2013.01); *G01D 18/008* (2013.01)

(58) Field of Classification Search
CPC ........ G01F 19/00; H04L 27/06; G01D 18/00; G01D 5/34; G01D 5/145; G01B 21/00
USPC ............. 702/14, 69, 72, 83, 90, 94, 106, 150, 702/183, 191
See application file for complete search history.

(56) References Cited

U.S. PATENT DOCUMENTS

| | | | |
|---|---|---|---|
| 5,946,356 A * | 8/1999 | Felix et al. ..................... 375/295 |
| 6,370,480 B1 * | 4/2002 | Gupta et al. ..................... 702/39 |
| 6,401,052 B1 * | 6/2002 | Herb et al. ..................... 702/150 |

(Continued)

FOREIGN PATENT DOCUMENTS

| JP | 3491577 | 5/2001 |
|---|---|---|
| JP | 2002-206911 | 7/2002 |

(Continued)

OTHER PUBLICATIONS

Machine Translation of Japanese Patent JP 2003-254785 A Taniguchi et al Feb. 28, 2002.*

(Continued)

*Primary Examiner* — Toan Le
*Assistant Examiner* — Manuel Rivera Vargas
(74) *Attorney, Agent, or Firm* — Nixon & Vanderhye P.C.

(57) ABSTRACT

A physical quantity detection apparatus includes a signal output section, a correction value calculation section, and a processing section. The signal output section outputs signals in accordance with a change in physical quantity of a detected object. The correction value calculation section calculates a correction value. The processing section corrects values based on actual output values of the signal output section with the correction value, calculates physical quantities of the detected object based on corrected values, and outputs calculated physical quantities. The correction value calculation section calculates the correction value based on primary error amounts that are differences between post-interpolation actual output values calculated by executing a linear function interpolation process to the values based on the actual output values within a predetermined physical quantity range and the values based on the actual output values corresponding to the post-interpolation actual output values.

4 Claims, 12 Drawing Sheets

(51) Int. Cl.
*G01B 21/00* (2006.01)
*G01B 21/22* (2006.01)

(56) References Cited

U.S. PATENT DOCUMENTS

| | | | |
|---|---|---|---|
| 6,498,479 B1 | 12/2002 | Hamaoka et al. | |
| 6,768,965 B2 * | 7/2004 | Martin et al. | 702/155 |
| 6,956,505 B2 | 10/2005 | Taniguchi et al. | |
| 7,454,281 B2 * | 11/2008 | Hori | 701/101 |
| 2006/0052973 A1 * | 3/2006 | Hiller | 702/150 |
| 2010/0004888 A1 * | 1/2010 | Seo | 702/94 |
| 2011/0115477 A1 | 5/2011 | Suzuki | |

FOREIGN PATENT DOCUMENTS

| | | |
|---|---|---|
| JP | 2003-254785 | 9/2003 |
| JP | 3491577 | 11/2003 |
| JP | 2007-071889 | 3/2007 |

OTHER PUBLICATIONS

Office Action (2 pages) dated Apr. 9, 2013, issued in corresponding Japanese Application No. 2011-154657 and English translation (3 pages).

Notification of the First Office Action issued in Chinese Application No. 201210243409.7 dated Aug. 14, 2014.

* cited by examiner

| BUFFER | B1 | B2 | B3 | B4 | B5 | B6 | B7 |
|---|---|---|---|---|---|---|---|
| CONTENT | ANGLE VALUE | ACTUAL OUTPUT VALUE | IDEAL OUTPUT VALUE | PRIMARY ERROR AMOUNT | SECONDARY ERROR AMOUNT | SECONDARY ERROR AMOUNT | POST-INTERPOLATION ERROR AMOUNT |
| STORED DATA | 0 | 0 | 0 | 0 | 0 | 0 | 0 |
|  | 1 | 12 | 1 | 11 | 0 | 0 | 0 |
|  | ... | ... | ... | ... | ... | ... | ... |
|  | 302 | 158 | 302 | −144 | 0 | 0 | 0 |
|  | ... | ... | ... | ... | ... | ... | ... |
|  | 749 | 914 | 749 | 165 | 0 | 0 | 0 |
|  | ... | ... | ... | ... | ... | ... | ... |
|  | 875 | 1005 | 875 | 130 | 0 | 0 | 0 |
|  | ... | ... | ... | ... | ... | ... | ... |
|  | 1023 | 1058 | 1023 | 35 | 0 | 0 | 0 |
|  | 1024 | 1024 | 1024 | 0 | 0 | 0 | 0 |

| BUFFER | B1 | B2 | B3 | B4 | B5 | B6 | B7 |
|---|---|---|---|---|---|---|---|
| CONTENT | ANGLE VALUE | ACTUAL OUTPUT VALUE | IDEAL OUTPUT VALUE | PRIMARY ERROR AMOUNT | SECONDARY ERROR AMOUNT | SECONDARY SECONDARY ERROR AMOUNT | POST-INTERPOLATION ERROR AMOUNT |
| STORED DATA | 0 | 0 | 0 | 0 | 0 | 0 | 0 |
| | 1 | 12 | 1 | 11 | 7 | 0 | 4 |
| | ... | ... | ... | ... | ... | ... | ... |
| | 302 | 158 | 302 | -144 | -215 | 0 | 71 |
| | ... | ... | ... | ... | ... | ... | ... |
| | 749 | 914 | 749 | 165 | 0 | 0 | 165 |
| | ... | ... | ... | ... | ... | ... | ... |
| | 875 | 1005 | 875 | 130 | 83 | 0 | 47 |
| | ... | ... | ... | ... | ... | ... | ... |
| | 1023 | 1058 | 1023 | 35 | 29 | 0 | 6 |
| | 1024 | 1024 | 1024 | 0 | 0 | 0 | 0 |

| BUFFER | B1 | B2 | B3 | B4 | B5 | B6 | B7 |
|---|---|---|---|---|---|---|---|
| CONTENT | ANGLE VALUE | ACTUAL OUTPUT VALUE | IDEAL OUTPUT VALUE | PRIMARY ERROR AMOUNT | SECONDARY ERROR AMOUNT | SECONDARY ERROR AMOUNT | POST-INTERPOLATION ERROR AMOUNT |
| STORED DATA | 0 | 0 | 0 | 0 | 0 | 0 | 0 |
| | 1 | 12 | 1 | 11 | 14 | 7 | -3 |
| | ... | ... | ... | ... | ... | ... | ... |
| | 302 | 158 | 302 | -144 | 0 | -215 | -144 |
| | ... | ... | ... | ... | ... | ... | ... |
| | 749 | 914 | 749 | 165 | 0 | 0 | 165 |
| | ... | ... | ... | ... | ... | ... | ... |
| | 875 | 1005 | 875 | 130 | 83 | 83 | 47 |
| | ... | ... | ... | ... | ... | ... | ... |
| | 1023 | 1058 | 1023 | 35 | 29 | 29 | 6 |
| | 1024 | 1024 | 1024 | 0 | 0 | 0 | 0 |

| BUFFER | B1 | B2 | B3 | B4 | B5 | B6 | B7 |
|---|---|---|---|---|---|---|---|
| CONTENT | ANGLE VALUE | ACTUAL OUTPUT VALUE | IDEAL OUTPUT VALUE | PRIMARY ERROR AMOUNT | SECONDARY ERROR AMOUNT | SECONDARY ERROR AMOUNT | POST-INTERPOLATION ERROR AMOUNT |
| STORED DATA | 0 | 0 | 0 | 0 | 0 | 0 | 0 |
| | 1 | 12 | 1 | 11 | 14 | 14 | −3 |
| | ... | ... | ... | ... | ... | ... | ... |
| | 302 | 158 | 302 | −144 | 0 | 0 | −144 |
| | ... | ... | ... | ... | ... | ... | ... |
| | 749 | 914 | 749 | 165 | 0 | 0 | 165 |
| | ... | ... | ... | ... | ... | ... | ... |
| | 875 | 1005 | 875 | 130 | 0 | 83 | 130 |
| | ... | ... | ... | ... | ... | ... | ... |
| | 1023 | 1058 | 1023 | 35 | 23 | 29 | 12 |
| | 1024 | 1024 | 1024 | 0 | 0 | 0 | 0 |

PHYSICAL QUANTITY DETECTION APPARATUS AND INSPECTION METHOD OF PHYSICAL QUANTITY DETECTION APPARATUS

CROSS REFERENCE TO RELATED APPLICATIONS

The present application is based on and claims priority to Japanese Patent Application No. 2011-154657 filed on Jul. 13, 2011, the contents of which are incorporated in their entirety herein by reference.

TECHNICAL FIELD

The present disclosure relates to a quantity detection apparatus and an inspection method of a quantity detection apparatus.

BACKGROUND

A conventional rotation angle detection apparatus for detecting a rotation angle of a detected object includes a magnetism generation section, such as a magnet, and a magnetic flux density detection section, such as a Hall element. One of the magnetism generation section and the magnetic flux density detection section is attached to the detected object. The magnetic flux density detection section detects a magnetism of the magnetism generation section when the detected object rotates, thereby detecting the rotation angle of the detected object. For example, JP-A-2002-206911 discloses a rotation angle detection apparatus that includes a magnet as a magnetism generation section, a magnetic flux density sensor as a magnetic flux density detection section, and a signal processor as a processing section. The signal processor executes a correction operation. The signal processor corrects actual output voltages, which are based on an output signals of the magnetic flux density sensor, on the basis of predetermined values (voltage level) corresponding to predetermined correction points. The predetermined correction points are set at regular intervals.

In cases where the intervals of the correction points are constant, a nonlinearity of the output signal is not improved, and an error in the actual output voltages remains as a linearity error in the rotation angle. JP-A-2007-71889 discloses a correction method that divides a region where an output change rate is large more finely than a region where the output change rate is small. Japanese Patent No. 3,491,577 (corresponding to U.S. Pat. No. 6,498,479) discloses a correction method in which output signals of a magnetism detection element are converted into digital signals, and the digital signal are processed with an arcsine function. However, when an output waveform is unclear, the correction methods disclosed in JP-A-2007-71889 and Japanese Patent No. 3,491,577 cannot be used.

SUMMARY

It is an object of the present disclosure to provide a physical quantity detection apparatus that can correct an actual output value regardless of an output waveform. Another object of the present disclosure is to provide an inspection method of the physical quantity detection apparatus.

A physical quantity detection apparatus according to an aspect of the present disclosure includes a signal output section, a correction value calculation section, and a processing section. The signal output section outputs signals in accordance with a change in physical quantity of a detected object. The correction value calculation section calculates a correction value. The processing section corrects values based on actual output values of the signal output section with the correction value, calculates physical quantities of the detected object based on corrected values, and outputs calculated physical quantities. The correction value calculation section calculates the correction value based on primary error amounts that are differences between post-interpolation actual output values calculated by executing a linear function interpolation process to the values based on the actual output values within a predetermined physical quantity range and the values based on the actual output values corresponding to the post-interpolation actual output values.

The physical quantity detection apparatus can correct the actual output values with accuracy regardless of an output waveform.

In the physical quantity detection apparatus, the correction value calculation section may execute a maximum absolute value calculation process in which the correction value calculation section calculates a maximum absolute value of secondary error amounts that are differences between post-interpolation error amounts calculated by executing a linear function interpolation process to the primary error amounts and the corresponding primary error amounts, and the correction value calculation section may set the correction value to the primary error amount corresponding to the maximum absolute value of the secondary error amounts.

In an inspection method of the physical quantity detection apparatus according to another aspect of the present disclosure, the physical quantity detection apparatus may be determined as a defective when the number of times the maximum absolute value calculation process is repeated is greater than or equal to a predetermined number of times.

By using the above-described inspection method, a defective physical quantity detection apparatus can be easily found.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Physical quantity detection apparatuses according to embodiments of the present disclosure will be described with reference to the accompanying drawings.

Figure 1:
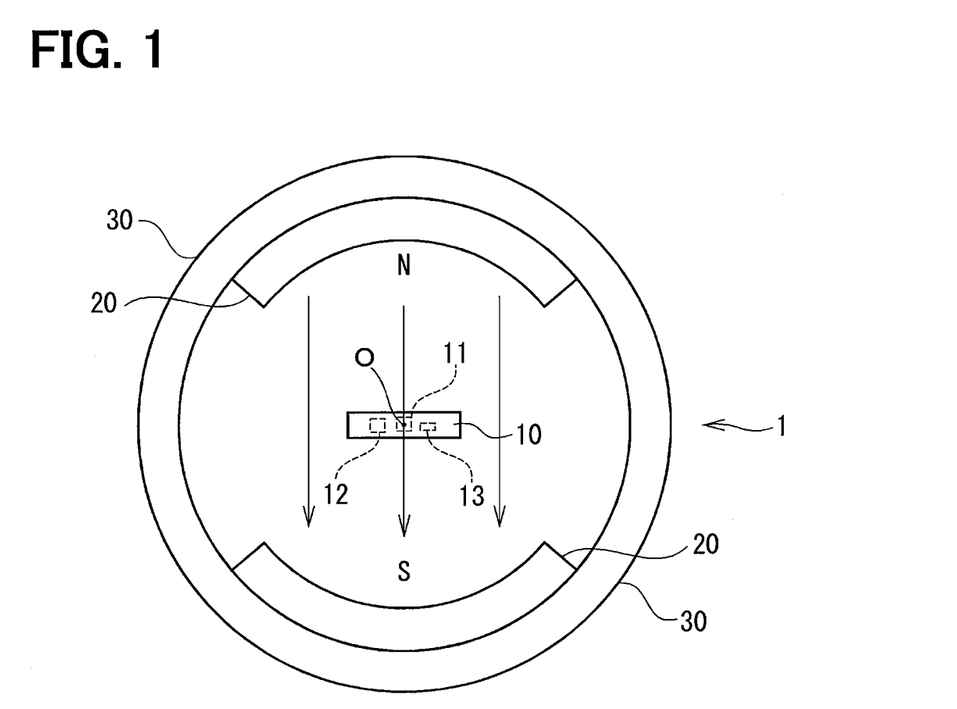
FIG. 1 a diagram showing a rotation angle detection apparatus according an exemplary embodiment of the present disclosure.

A physical quantity detection apparatus according to an exemplary embodiment of the present disclosure can be suitably used for a rotation angle detection apparatus 1. The rotation angle detection apparatus 1 detects, for example, a relative rotation angle of a valve stem of a throttle as a detected object. The relative rotation angle is an example of a physical quantity. The rotation angle detection apparatus 1 includes a permanent magnet 20 and a Hall integrated circuit (Hall IC) 10. The Hall IC 10 includes a Hall element 11 and a digital signal processor (DSP) 12, and a memory 13.

The permanent magnet 20 is attached to a yoke 30 as a detected object disposed on the valve stem of the throttle. The permanent magnet 20 is relatively rotatable with respect to the Hall IC 10 with a rotation of the yoke 30. The Hall element 11 is made of a semiconductor thin film. The Hall element 11 operates as a signal output section. The Hall element 11 outputs a signal in accordance with a change in magnetic flux density.

The DSP 12 is specialized to process digital signals. The DSP 12 performs, for example, a correction process and a rotation angle arithmetic process to values that are output from the Hall element 11 and are converted into digital signals. The DSP 12 operates as a processing section.

The memory 13 includes for example, a read-only memory or a writable and erasable memory. The memory 13 stores various kinds of data used by the DSP 12. The memory 13 further stores correction values K(1) through K(m) corresponding to rotation angles of the yoke 30, where "m" is a natural number greater than 1.

Figure 2:
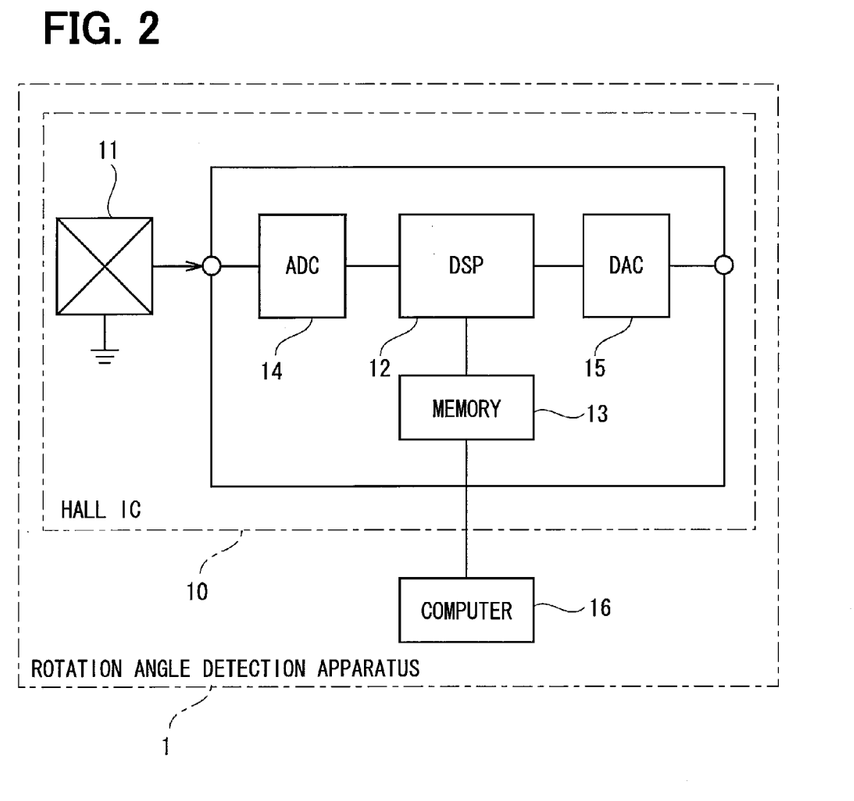
FIG. 2 is a diagram showing a processing circuit in the rotation angle detection apparatus.

In the present embodiment, the Hall IC 10 is an IC chip in which an analog-digital converter circuit (hereafter, referred to as ADC) 14 and a digital-analog converter circuit (hereafter, referred to as DAC) 15 as well as the Hall element 11, the DSP 12, and the memory 13 are built. The Hall IC 10 is disposed in such a manner that a magnetic-force sensing surface of the Hall element 11 is located on a center axis O.

A computer 16 is disposed outside the Hall IC 10. The computer 16 calculates the correction values K(1) through K(m) and stores the correction values K(1) through K(m) in the memory. The computer 16 operates as a correction value calculation section.

Figure 3:
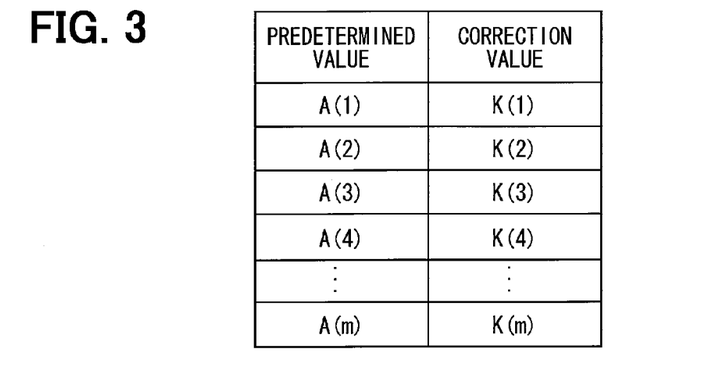
FIG. 3 is a diagram showing correspondence relationships between predetermined values and correction values.

Next, an operation of the rotation angle detection apparatus 1 will be described. The Hall element 11 outputs signals in accordance with a change in the magnetic flux generated by relative rotation around the center axis O with respect to the permanent magnet 20. The ADC 14 converts analog values output from the Hall element 11 into digital values and transmits the digital values to the DSP 12. Hereafter, the digital values output from the ADC 14 is referred to as actual output values. The DSP 12 executes the correction process and the rotation angle arithmetic process. The DSP 12 transmits the processed result to the DAC 15. The DAC 15 converts the digital values transmitted from the DSP 12 into analog values and outputs the analog values. In the correction process executed by the DSP 12, m-correction points are previously set, and the DSP 12 corrects the actual output values based on the predetermined values corresponding to the m-correction points. In the memory 13, predetermined values A(1) through A(m) corresponding to respective correction points and the correction values K(1) through K(m) are stored. As shown in FIG. 3, the predetermined values A(1) through A(m) correspond to the correction values K(1) through K(m), respectively. The predetermined values A(1) through A(m) are values within a range of the actual output value (voltage level) of the Hall element 11. A rotatable angle range of the detected object is an example of a predetermined physical quantity range.

The DSP 12 corrects the actual output values of the Hall element 11 based on the predetermined values A(1) through A(m) and the correction values K(1) through K(m). When the actual output value is equal to one of the predetermined values A(1) through A(m), the DSP 12 subtracts the correction value that corresponds to the predetermined value equal to the actual output value from the actual output value to correct the actual output value. For example, when the actual output value is equal to the predetermined value A(3), since the correction value corresponding to the predetermined value A(3) is K(3), the actual output value is corrected as A(3)-K(3).

When the actual output value is not equal to any of the predetermined values A(1) through A(m), an arithmetic correction value K corresponding to the actual output value is subtracted from the actual output value to correct the actual output value. The arithmetic correction value K is calculated by a linear function interpolation process with the Equation 2 derived from Equation 1 using two predetermined values between which the actual output value is and two correction values corresponding to the two predetermined values.

$$\{K(n)-K(n-1)\}/\{A(n)-A(n-1)\}=\{K-K(n-1)\}/\{A-A(n-1)\} \quad \text{Eq. 1}$$

$$K=\{K(n)-K(n-1)\}/\{A(n)-A(n-1)\}\times\{A-A(n-1)\}+K(n-1) \quad \text{Eq. 2}$$

For example, it is assumed that the actual output value A is between the predetermined value A(3) and the predetermined value A(4) and the arithmetic correction value corresponding to the actual output value A is K. By substituting the actual output value A, the predetermined value A(3), the predetermined value A(4), the correction value K(3), and the correction value K(4) into the Equation 1, Equation 3 is obtained.

$$\{K(4)-K(3)\}/\{A(4)-A(3)\}=\{K-K(3)\}/\{A-A(3)\} \quad \text{Eq. 3}$$

From Equation 3, Equation 4 is obtained.

$$K=[\{K(4)-K(3)\}/\{A(4)-A(3)\}]\times\{A-A(3)\}+K(3) \quad \text{Eq. 4}$$

Since the actual output value is corrected into A-K, the actual output value is corrected into a value A-[{K(4)-K(3)}/{A(4)-A(3)}]×{A-A(3)}+K(3). In this way, the DSP 12 corrects the actual output value by subtracting the arithmetic correction value calculated by a linear function interpolation process from the actual output value, and thereby calculating the rotation angle.

Figure 4:
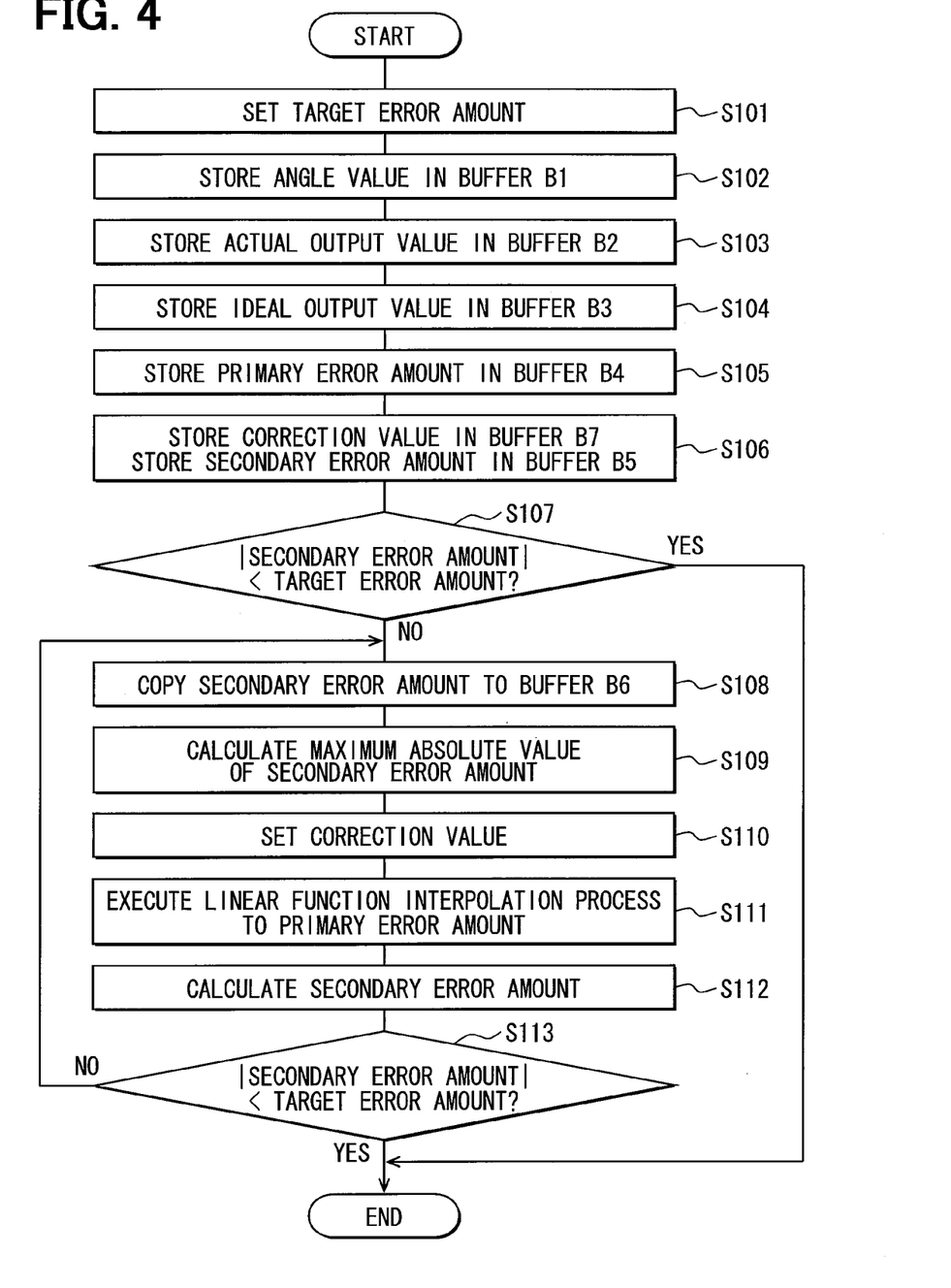
FIG. 4 is a flowchart showing a correction value calculation process.

A setting of the correction values will be described with reference to FIG. 4 to FIG. 16. In the present embodiment, the computer 16 disposed outside the Hall IC 10 calculates the correction values by executing a correction value calculation process shown in FIG. 4. At S101, the computer 16 sets a target error amount. For example, the computer 16 sets the target error amount to 80.

Figure 6:
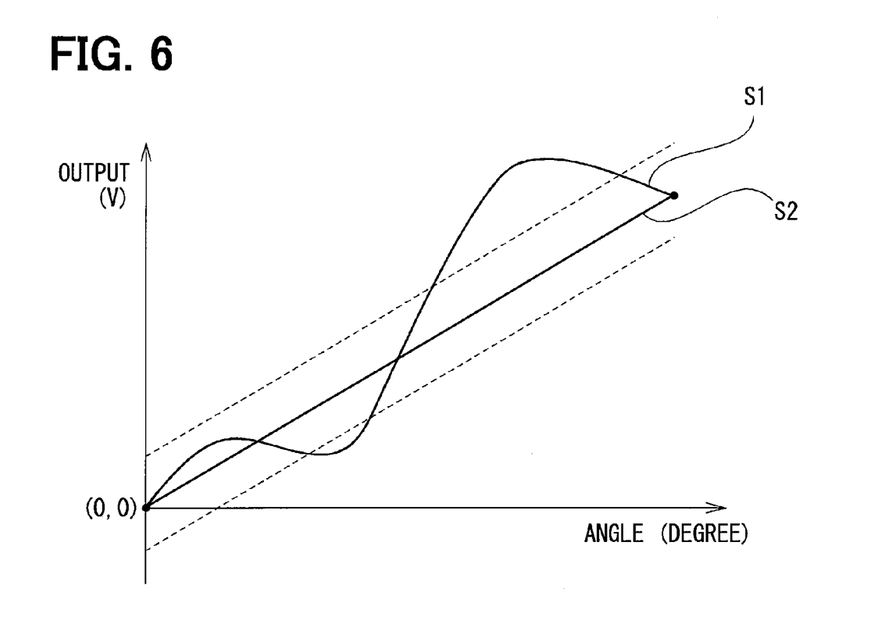
FIG. 6 is a graph showing a relationship between angle and output signal of the rotation angle detection apparatus.

At S102, the computer 16 stores angle values, which correspond to angles within a rotatable angle range of the yoke 30, in a buffer B1. In the present embodiment, the rotatable angle range of the yoke 30 is 90 degrees. In FIG. 6, an angle value 0 stored in the buffer B1 corresponds to 0 degree, and an angle value 1024 corresponds to 90 degrees. In other words, one scale of the angle values stored in the buffer B1 corresponds to 90/1024 degrees.

At S103, the computer 16 detects the actual output values, which corresponds to the rotation angles of the yoke 30, from the Hall element 11 and stores the actual output values in a buffer B2. As shown in FIG. 6, the actual output values is expressed as a curved line S1 passing through a point (0, 0).

At S104, the computer 16 calculates ideal output values based on the actual output values detected by the Hall element 11. In the present embodiment, the ideal output values are values on a straight line expressed by a linear function connecting the maximum value and the minimum value of the actual output values. As shown in FIG. 6, the ideal output values are expressed by a linear line S2 passing through the point (0, 0). The computer 16 stores the ideal output values in a buffer B3. The ideal output values correspond to post-interpolation actual output values.

Figure 7:
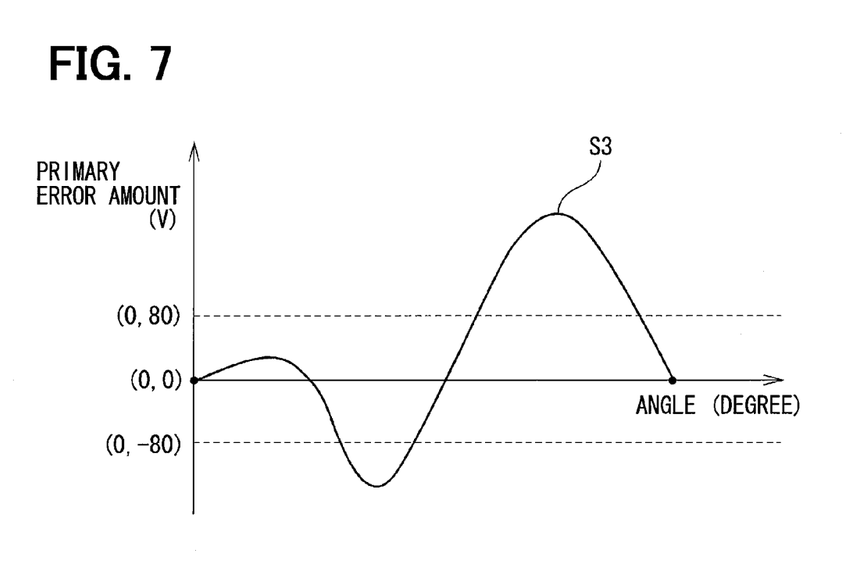
FIG. 7 is a graph showing a relationship between angle and primary error amount of the rotation angle detection apparatus.

At S105, the computer 16 calculates primary error amounts of the actual output values. The primary error amounts are differences between the actual output values and the corresponding ideal output values. The computer 16 calculates differences between the actual output value stored in the buffer B2 and the ideal output values stored in the buffer B3 and stores the differences as the primary error values in a buffer B4. As shown in FIG. 7, the primary error amounts corresponding to angles within the predetermined angle range is expressed by a curved line S3.

Figure 5:
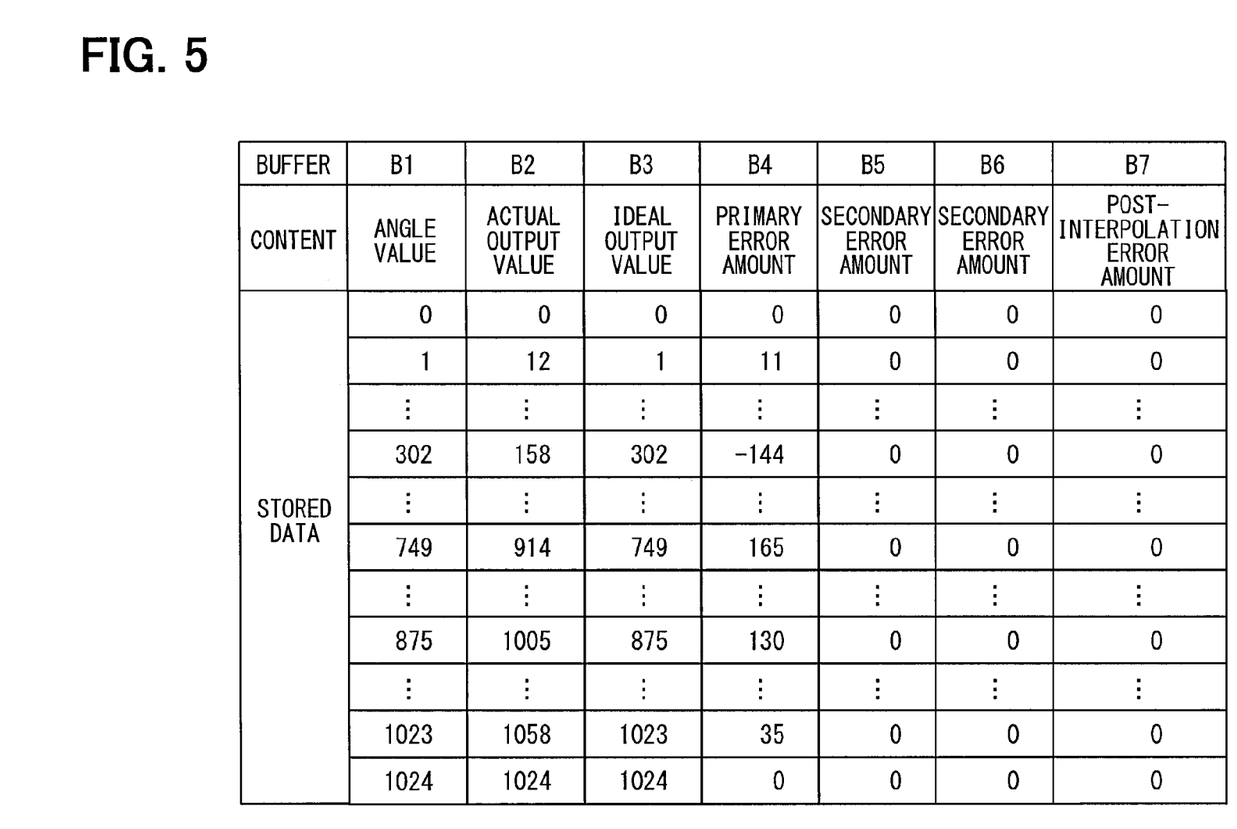
FIG. 5 is a diagram showing contents of buffers in the correction value calculation process.
Figure 8:
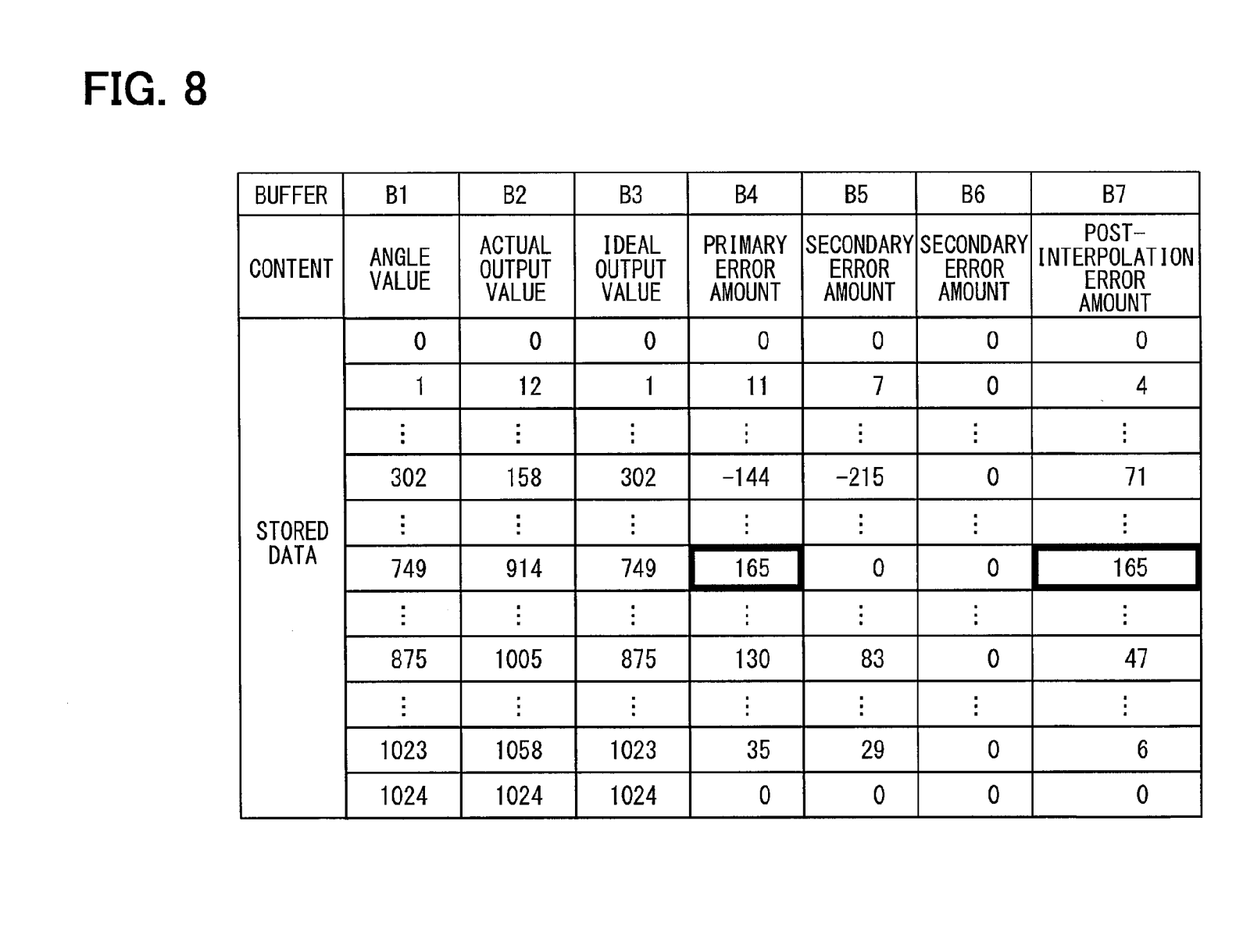
FIG. 8 is a diagram showing contents of the buffers in the correction value calculation process.
Figure 9:
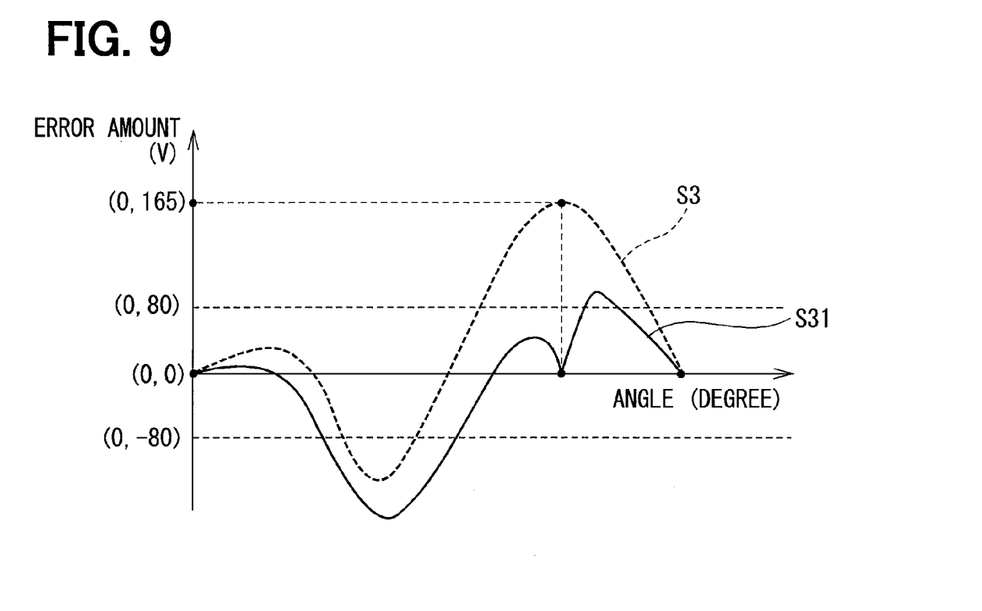
FIG. 9 is a graph showing a relationship between angle and error amount of the rotation angle detection apparatus.
Figure 10:
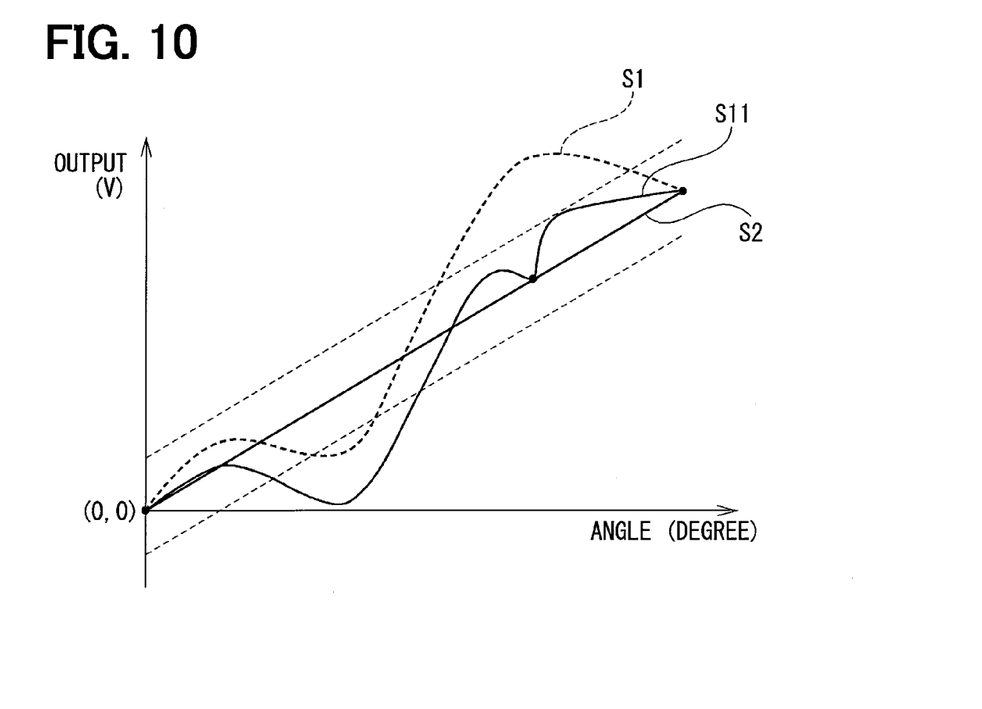
FIG. 10 is a graph showing a relationship between angle and output signal of the rotation angle detection apparatus.

At S106, the computer 16 sets the correction value and executes a linear function interpolation process to the primary error values. The computer 16 sets the correction value to the maximum absolute value of the primary error amounts stored in the buffer B4 and stores the correction value in a corresponding region in a buffer B7. As shown in FIG. 5 and FIG. 8, the maximum absolute value stored in the buffer B4 is 165. Thus, the computer 16 sets the correction value to 165 and stores the correction value in the corresponding region in the buffer 7. Furthermore, at S106, the computer 16 executes a linear function interpolation process to the primary error amounts between 165 and 0 in the buffer B4 and stores calculated amounts as post-interpolation error amounts in a corresponding region in the buffer B7. Subsequently, the computer 16 calculates differences between the values stored in the buffer B4 and the values stored in the corresponding region in the buffer B7 and stores the differences as secondary error amounts in a buffer B5. As shown in FIG. 9, the secondary error amounts stored in the buffer B5 are expressed by a curved line S31. In addition, as shown in FIG. 10, the actual output values corrected with the correction value 165 is expressed by a curved line S11.

At S107, the computer 16 determines whether the absolute values of all the secondary error amounts stored in the whole region in the buffer B5 are less than the target error amount. When the absolute values of all the secondary error amounts are less than the target error amount, which corresponds to "YES" at S107, the correction value calculation process ends. When the absolute values of all the secondary error amounts not are less than the target error amount, that is, when at least one of the absolute values of the secondary error amounts is greater than or equal to the target error amount, which corresponds to "NO" at S107, the correction value calculation process proceeds to S108. In the present example, because the secondary error amount whose absolute value is greater than target error amount (=80) exists in the buffer B5, the correction value calculation process proceeds to S108.

Figure 11:
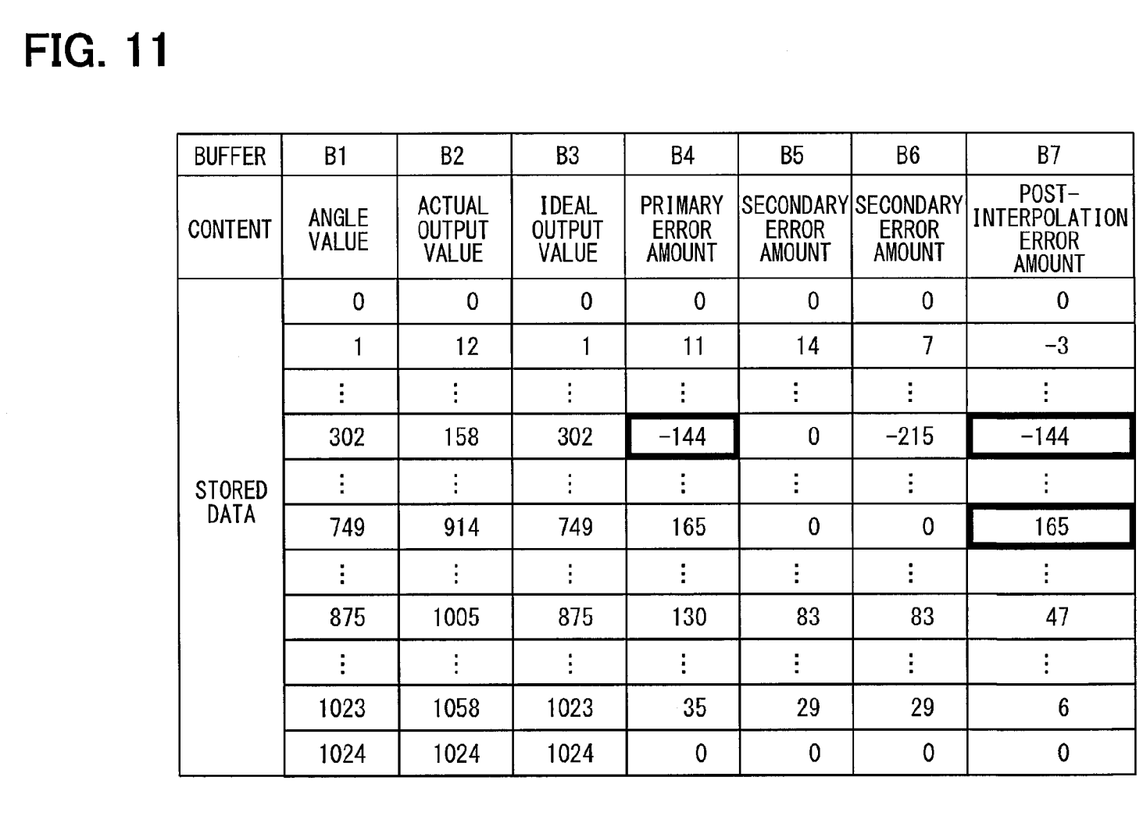
FIG. 11 is a diagram showing contents of the buffers in the correction value calculation process.

At S108, the computer 16 copies the secondary error amounts stored in the buffer B5 to a buffer B6 as shown in FIG. 8 and FIG. 11.

At S109, the computer 16 calculates the maximum absolute value of the secondary error amounts stored in buffer B6. In the present example, as shown in FIG. 11, the maximum absolute value is 215.

At S110, the computer 16 sets the correction value. The computer 16 sets the correction value to the primary error amount corresponding to the maximum absolute value of the secondary error amounts detected at S109, and stores the correction value in a corresponding region in the buffer B7. In the present example, as shown in FIG. 11, −144 of the buffer B4 corresponding to −215 in the buffer B6 is stored in the corresponding region in the buffer 7.

At S111, the computer 16 executes a linear function interpolation process to the primary error amounts. Specifically, the computer 16 executes the linear function interpolation process to the primary error amounts corresponding to the secondary error amounts between the maximum absolute value in the buffer B6 and 0-value in the buffer B6 closest to the maximum absolute value, and then the computer 16 stores calculated values in corresponding regions in the buffer B7. In the present example, as shown in FIG. 11, the computer 16 executes the linear function interpolation process to the primary error amounts in the buffer B4 corresponding to the angle value 0 to the angle value 302 and the primary error amounts in the buffer B4 corresponding to the angle value 302 to the angle value 749, and the computer 16 stores the calculated values as post-interpolation error amounts in the corresponding regions in the buffer B7.

Figure 12:
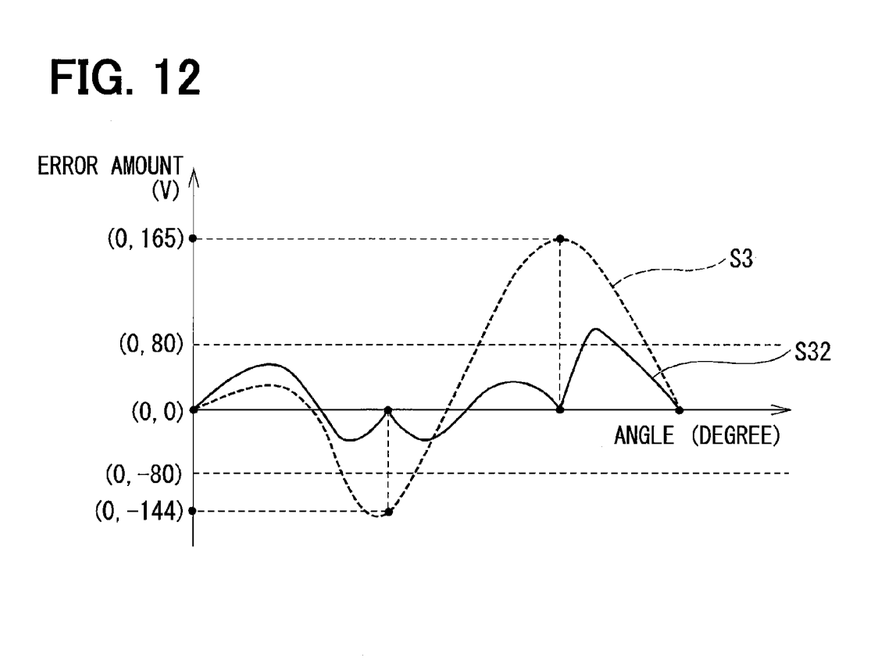
FIG. 12 is a graph showing a relationship between angle and error amount of the rotation angle detection apparatus.
Figure 13:
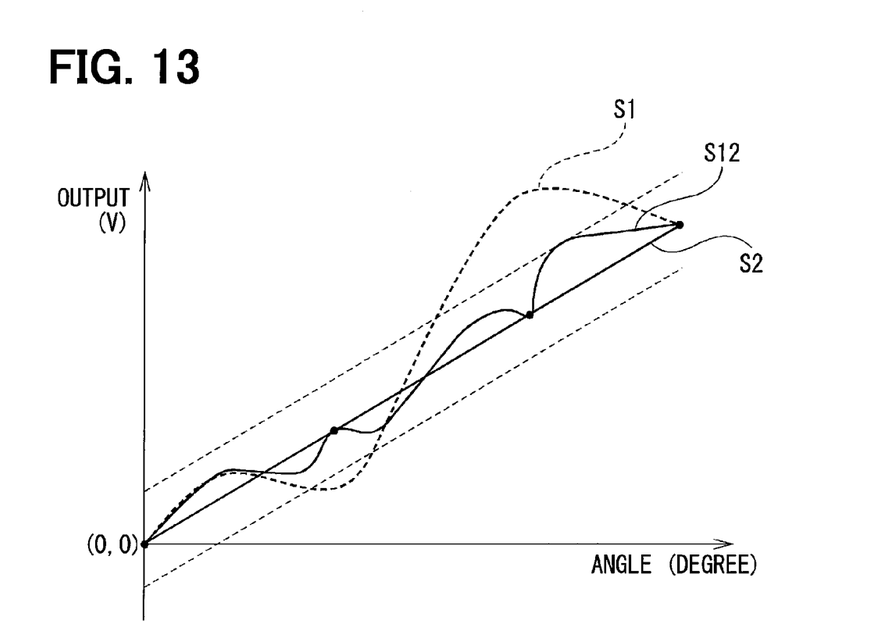
FIG. 13 is a graph showing a relationship between angle and output signal of the rotation angle detection apparatus.

At S112, the computer 16 calculates secondary error amounts. Specifically, the computer 16 calculates differences between the primary error amounts stored in the buffer B4 and the corresponding post-interpolation error amounts stored in the buffer B7 and stores the differences as new secondary error amounts in the buffer B5. Accordingly, as shown in FIG. 11, the values in the buffer B5 are replaced by the differences between the values in the buffer B4 and the values in the buffer B7. As shown in FIG. 12, the secondary error amounts stored in the buffer B5 is expressed by a curved line S32. In addition, as shown in FIG. 13, the actual output values corrected with the correction values 165 and −144 is expressed by a curved line S12.

At S113, the computer 16 determines whether the absolute values of all the secondary error amounts are less than the target error amount. When the absolute values of all the secondary error amounts are less than the target error amount, which corresponds to "YES" at S113, the correction value calculation process ends. When the absolute values of all the secondary error amounts are not less than the target error amount, that is, when at least one of the absolute values of the secondary error amounts is greater than or equal to the target error amount, which corresponds to "NO" at S113, the process returns to S108. In the present example, as shown in FIG. 11 and FIG. 12, because the secondary error amount whose absolute value is greater than or equal to the target error amount 80 remains in the buffer B5, the correction value calculation process returns to S108.

Figure 14:
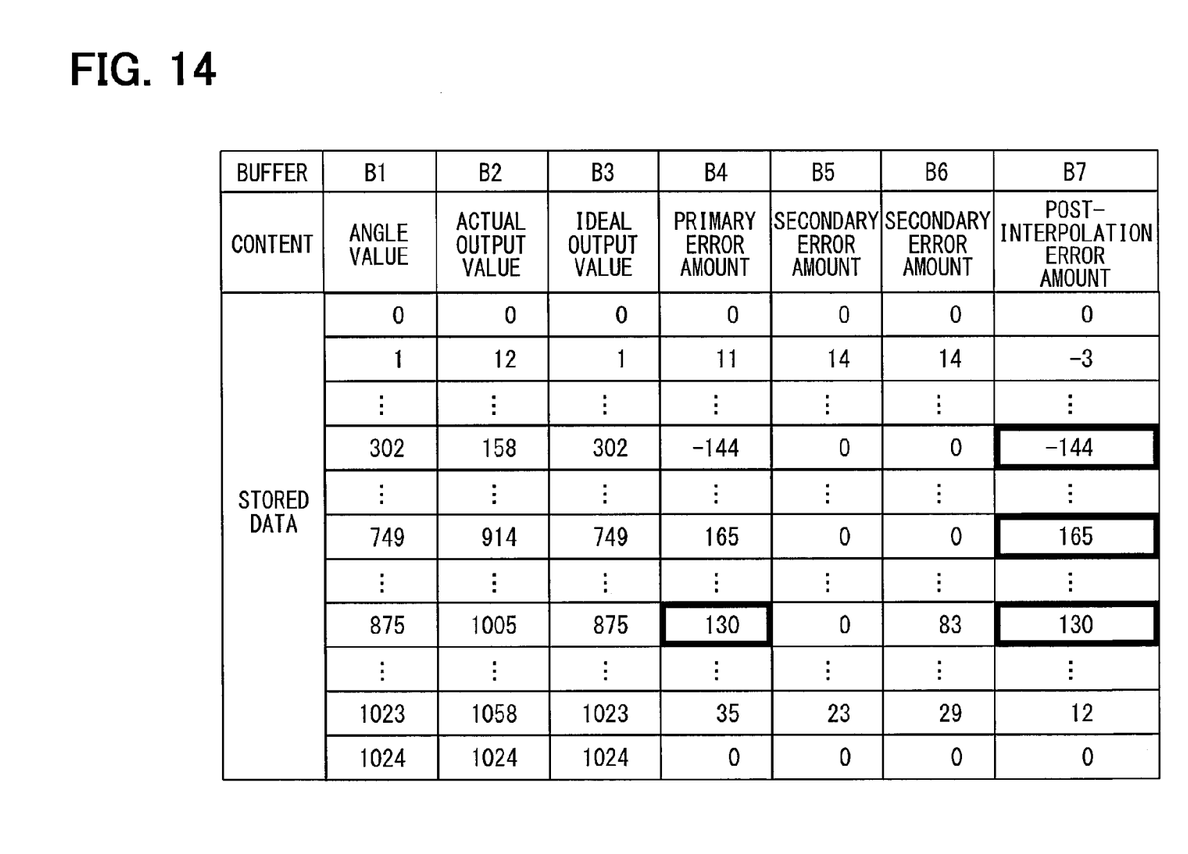
FIG. 14 is a diagram showing contents of the buffers in the correction value calculation process.

At S108, the computer 16 copies the second error amounts stored in the buffer B5 to the buffer B6 as shown in FIG. 11 and FIG. 14.

At S109, the computer 16 detects the maximum absolute value of the secondary error amounts stored in the buffer B6. In the present example, the maximum absolute value of the secondary error amount stored in the buffer B6 is 83.

At S110, the computer 16 sets a correction value. The computer 16 sets the correction value to the primary error amount corresponding to the maximum absolute value of the secondary error amounts detected at S109 and stores the correction value in the corresponding region in the buffer B7. In the present example, as shown in FIG. 14, the primary error amount 130 in the buffer B4 corresponding to the maximum absolute value 83 in the buffer B6 is stored in the corresponding region in the buffer B7.

At S111, the computer 16 executes the linear function interpolation process to the primary error amounts. Specifically, the computer 16 executes the linear function interpolation process to the primary error amounts corresponding to the secondary error amounts between the maximum absolute value in the buffer B6 and 0-value closest to the maximum absolute value in the buffer B6, and then the computer 16 stores calculated values in the corresponding regions in the buffer B7. As shown in FIG. 14, the angle value corresponding to the maximum absolute value 83 in the buffer B6 is 875, and the angle values corresponding to 0-values in the buffer B6 closest to the maximum absolute value 83 are 749 and 1024. Thus, the computer 16 executes the linear function interpolation process to the primary error amounts in the buffer B4 corresponding to the angle value 749 to the angle value 875 and the primary error amounts in the buffer B4 corresponding to the angle value 875 to the angle value 1024, and then stores calculated values in the corresponding regions in the buffer B7.

Figure 15:
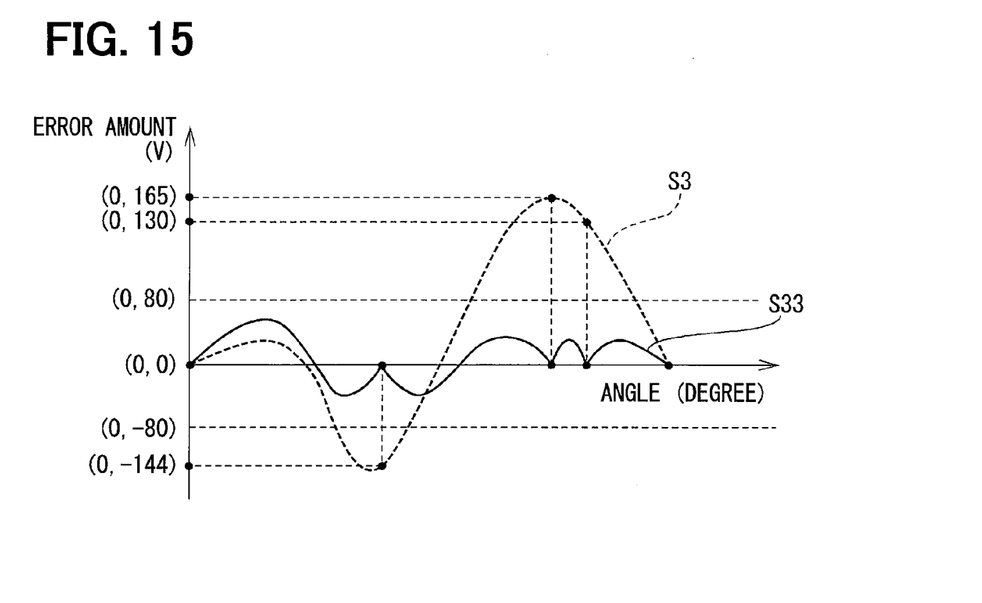
FIG. 15 is a graph showing a relationship between angle and error amount of the rotation angle detection apparatus.
Figure 16:
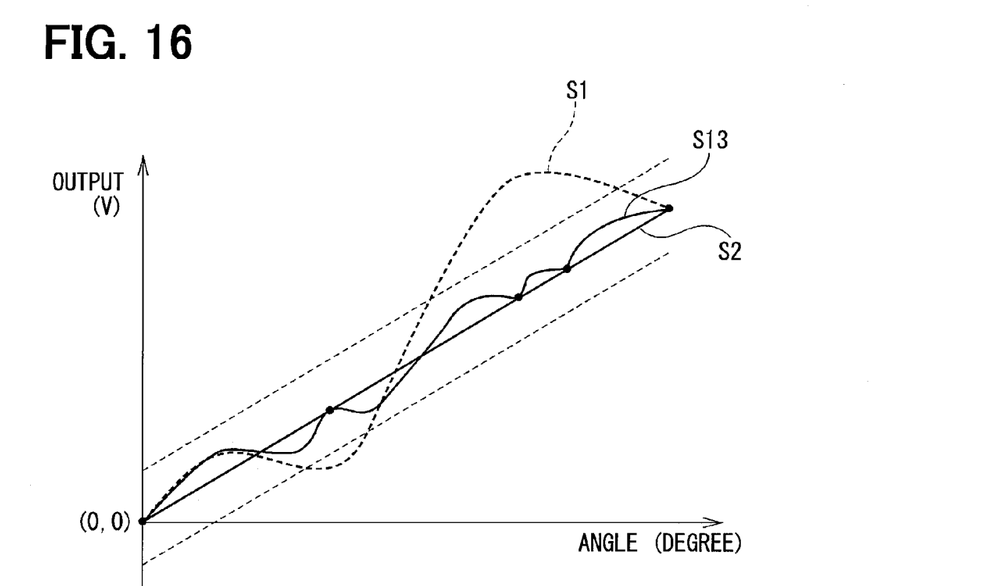
FIG. 16 is a graph showing a relationship between angle and output signal of the rotation angle detection apparatus.

At S112, the computer 16 calculates new secondary error amounts. Accordingly, as shown in FIG. 11, the values in the buffer B5 are replaced by the differences between the values in the buffer B4 and the values in the buffer B7. As shown in FIG. 15, the secondary error amounts stored in the buffer B5 is expressed by a curved line S33. In addition, as shown in FIG. 16, the actual output values corrected with the correction values 165, −144, 83 are expressed by a curved line S33.

At S113, the computer 16 determines whether the absolute values of all the secondary error amounts are less than the target error amount 80. As shown in FIG. 14, in the buffer B5, there is no secondary error amount whose absolute value is greater than or equal to the target error amount 80. Thus, the correction value calculation process ends.

The processes from S108 though S113 are repeated until the absolute values of all the secondary error amounts become less than the target error amount 80. The processes from S108 through S113 correspond to a maximum absolute value calculation process.

Next, an inspection method of the rotation angle detection apparatus 1 will be described. In the present embodiment, it is determined that the rotation angle detection apparatus 1 is a defective if the number of the maximum absolute value calculation process repeated before the maximum absolute value becomes less than the target error amount 80 is greater than or equal to a predetermined number of times. For example, when the number of the maximum absolute value calculation process repeated before the maximum absolute value becomes less than the target error amount 80 is greater than or equal to 6, it is determined that the rotation angle detection apparatus 1 is a defective.

Figure 17:
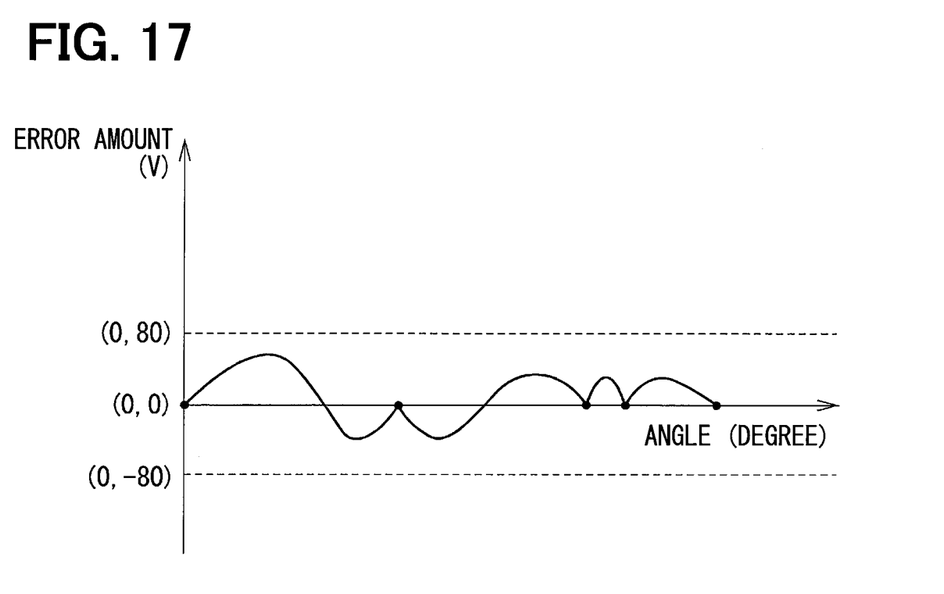
FIG. 17 is a graph showing a relationship between angle and error amount of the rotation angle detection apparatus.

In the present embodiment, the computer 16 sets the correction value to the primary error amount corresponding to the maximum absolute value of the secondary error amounts of the actual output values. Accordingly, appropriate correction points can be calculated, and the actual output values can be corrected with high accuracy regardless of a shape of an output waveform. In FIG. 17, the error amounts of the actual output values corrected with the correction values 165, −144, 83 are shown. As shown in FIG. 17, the rotation angle detection apparatus 1 according to the present embodiment can correct the actual output values with high accuracy with a few correction points. In addition, because the correction value is always set to the primary error amount corresponding to the maximum absolute value of the secondary error amounts, the correction values and the correction points can be set from a point where the error amount is the largest, the most appropriate correction values and the most appropriate correction points can be set. Furthermore, because the correction values are calculated by executing the linear function interpolation process to the actual output values, the calculation can be simplified and a processing time can be reduced.

In the present embodiment, the target error amount 80 is set. Thus, the number of maximum absolute value calculation process can be restricted, and increase in the processing time can be restricted.

In the present embodiment, it is determined that the rotation angle detection apparatus 1 is a defective if the number of correction values is greater than a predetermined value when the correction values are calculated until the maximum absolute value of the secondary error amounts becomes less than the target error amount 80. Accordingly, a defective rotation angle detection apparatus 1 can be easily found.

In the above-described embodiment, the physical quantity detection apparatus is applied to the rotation angle detection apparatus. In another embodiment, the physical quantity detection apparatus may also be applied to a stroke amount detection apparatus. The physical quantity detection apparatus may also be used to correct actual output values having other curved line. In the above-described embodiment, the computer 16 as the correction value calculation section that calculates the correction values is disposed outside the Hall IC 10. In another embodiment, an arithmetic device, such as a microcomputer, as a correction value calculation section may be disposed in a Hall IC. In the above-described embodiment, the correction value calculation section sets the correction value by executing the maximum absolute value calculation process to the primary error amounts of the actual output values, and the processing section executes the correction process to the actual output values with the correction values. In another embodiment, the correction value calculation section may set a correction value by executing the maximum absolute value calculation process to primary error amounts of values obtained by processing actual output values with an arcsine function or an arccosine function, and the processing section may execute a correction process to the value, which is processed with the arcsine function or the arccosine function, using the correction value.

While the present disclosure has been described with reference to the foregoing embodiments, it is to be understood that the disclosure is not limited to the embodiments and constructions. The present disclosure is intended to cover various modification and equivalent arrangements.

What is claimed is:

1. A physical quantity detection apparatus comprising:
a signal output section that outputs signals in accordance with a change in physical quantity of a detected object;
a predetermined correction value calculation section that calculates a predetermined correction value; and
a processing section that corrects values based on actual output values of the signal output section with the predetermined correction value, calculates physical quantities of the detected object based on corrected values, and outputs calculated physical quantities,
wherein the predetermined correction value calculation section calculates the predetermined correction value based on primary error amounts that are differences between post-interpolation actual output values calculated by executing a linear function interpolation process to the values based on the actual output values within a predetermined physical quantity range and the values based on the actual output values corresponding to the post-interpolation actual output values
wherein the predetermined correction value calculation section
executes a maximum absolute value calculation process in which the predetermined correction value calculation section calculates a maximum absolute value of secondary error amounts that are differences between
post-interpolation error amounts calculated by executing a linear function interpolation process to the primary error amounts and
the corresponding primary error amounts and
sets the predetermined correction value to the primary error amount corresponding to the maximum absolute value of the secondary error amounts, and
wherein the values based on the actual output values are values obtained by processing the actual output values with an arcsine function or an arccosine function;
wherein the physical quantity detection apparatus is a rotation angle sensing device, the physical quantity is rotation angle and the signal output section is a Hall element.

2. The physical quantity detection apparatus according to claim 1,
wherein the predetermined correction value calculation section repeats
the maximum absolute value calculation process and
setting the predetermined correction value to the primary error amount corresponding to the maximum absolute value of the secondary error amounts
until the maximum absolute value of the secondary error amounts becomes less than a predetermined threshold value.

3. The physical quantity detection apparatus according to claim 1,
wherein the physical quantity is a relative rotation angle or a relative stroke amount.

4. An inspection method of the physical quantity detection apparatus according to claim 1, comprising
determining the physical quantity detection apparatus as defective when the number of times the maximum absolute value calculation process is repeated is greater than or equal to a predetermined number of times.

* * * * *